United States Patent
Bator, Jr. et al.

(10) Patent No.: US 6,482,541 B1
(45) Date of Patent: Nov. 19, 2002

(54) BATTERY SLEEVE FRAME

(75) Inventors: Robert J. Bator, Jr., Wyomissing, PA (US); Gary William Parsons, Elizabethtown, PA (US)

(73) Assignee: EnerSys Inc., Reading, PA (US)

( * ) Notice: Subject to any disclaimer, the term of this patent is extended or adjusted under 35 U.S.C. 154(b) by 183 days.

(21) Appl. No.: 09/702,369

(22) Filed: Oct. 31, 2000

Related U.S. Application Data

(60) Provisional application No. 60/163,181, filed on Nov. 3, 1999.

(51) Int. Cl.⁷ .............................................. H01M 2/10
(52) U.S. Cl. ........................ 429/100; 429/96; 429/99; 429/152; 429/153; 429/163; 429/176; 429/186
(58) Field of Search ........................... 429/96, 99, 100, 429/176, 186, 152, 153, 163

(56) References Cited

U.S. PATENT DOCUMENTS

| | | | |
|---|---|---|---|
| 5,403,679 A | * | 4/1995 | Stone ......................... 429/99 |
| 5,437,939 A | * | 8/1995 | Beckley ....................... 429/99 |
| 5,981,101 A | * | 11/1999 | Stone ......................... 429/100 |

* cited by examiner

Primary Examiner—Patrick Ryan
Assistant Examiner—Angela J. Martin
(74) Attorney, Agent, or Firm—Akin, Gump, Strauss, Hauer & Feld, L.L.P.

(57) ABSTRACT

A frame assembly for receiving and supporting batteries in at least one horizontal row comprises a pair of generally parallel spaced apart, aligned base supports with each base support having a front end and a rear end. Four vertical corner supports, including a front pair and a rear pair are secured to the base supports with the front pair of corner supports being generally equally spaced from the rear pair of corner supports. At least one pair of horizontal supports are secured to the corner supports. The horizontal support pair includes a front horizontal support and a rear horizontal support. Each horizontal support has two ends with each end of the front horizontal support being secured to one of the corner supports of the front pair of corner supports and with each end of the rear horizontal support being secured to one of the corner supports of the rear pair of corner supports. The horizontal supports are both secured at each end to the corner supports at a first predetermined distance from the base supports, the first predetermined distances being established so that at least one battery may be supported by the first pair of horizontal supports to establish a first horizontal battery row.

26 Claims, 10 Drawing Sheets

BATTERY SLEEVE FRAME

CROSS-REFERENCE TO RELATED APPLICATION

This application claims the benefit of U.S. Provisional Patent Application No. 60/163,181, filed Nov. 3, 1999 and entitled "Battery Sleeve Frame".

BACKGROUND OF THE INVENTION

Battery assemblies for uninterruptable power supplies and telecommunication systems are known. Such battery assemblies conventionally utilize lead acid, nickel cadmium or other types of battery cells which are mounted in a support frame and electrically connected together. However, the known assemblies have generally been designed to accommodate a fixed number of battery cells.

It would be desirable to provide a sleeve frame design for assembling batteries together to provide an uninterruptable power supply which can be used to accommodate a varying number of battery cells, and which is usable in seismic zones. It would also be desirable to provide a system such that compression is developed uniformly across the cells as the cells heat up during use. It would also be desirable to provide improved air flow around the cells by creating an air flow space between modules as well as between battery sleeves.

BRIEF SUMMARY OF THE INVENTION

Briefly stated, the present invention comprises a frame assembly for receiving and supporting batteries in at least one horizontal row. The frame assembly comprises a pair of generally parallel spaced apart, aligned base supports, each base support having a front end and a rear end. Four vertical corner supports, including a front pair and a rear pair are provided. A first end of each corner support is secured to one of the base supports with the front pair of corner supports being generally equally spaced from the rear pair of corner supports. At least one pair of horizontal supports are provided, including a front horizontal support and a rear horizontal support. Each horizontal support has two ends, with each end of each front horizontal support being secured to one of the corner supports of the front pair of corner support and with each of each of the rear horizontal supports being secured to one of the corner supports of the rear pair of corner supports. The horizontal supports are both secured at each end to the corner supports at a first predetermined distance from the base supports. The first predetermined distance is established so that at least one battery may be supported by the pair of horizontal supports to establish a first horizontal battery row.

In a preferred embodiment, the present invention comprises a sleeve for receiving a battery. The sleeve comprises a top panel with a connected side panel extending from a first side and a first lip extending from a second side thereof. The sleeve further includes a bottom panel with a connected side panel extending from a second side and a second lip extending from a first side thereof. A rear panel includes a third lip extending from a first side and a fourth lip extending from a second side thereof. The top panel lip extends over and engages at least a portion of the second side panel and the bottom panel lip extends and engages at least a portion of the first side panel. The third lip of the rear panel extends over and engages at least a portion of the first side panel and the fourth lip of the rear panel extends over and engages at least a portion of the second side panel.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
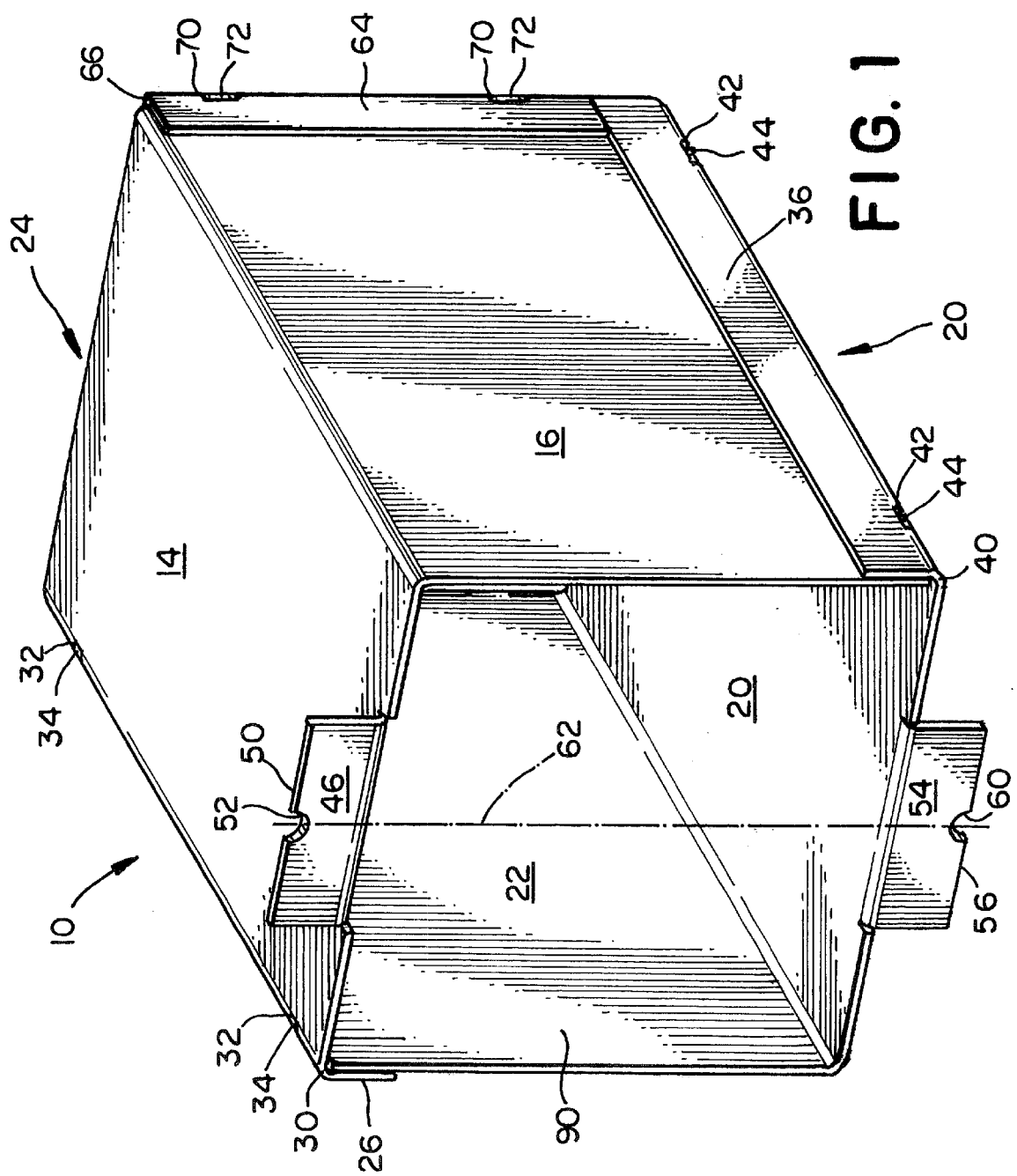
FIG. 1 is a perspective view of a battery sleeve insertable into a sleeve frame design in accordance with a preferred embodiment of the present invention.

Certain terminology is used in the following description for convenience only and is not limiting. The words "right," "left," "lower," and "upper" designate directions in the drawings to which reference is made. The words "inwardly" and "outwardly" refer to directions towards and away from, respectively, the geometric center of the battery sleeve frame in accordance with the present invention, and designated parts thereof. The word "a" is defined to mean "at least one". The terminology includes the words noted above as well as derivatives thereof and words of similar import.

Figure 2:
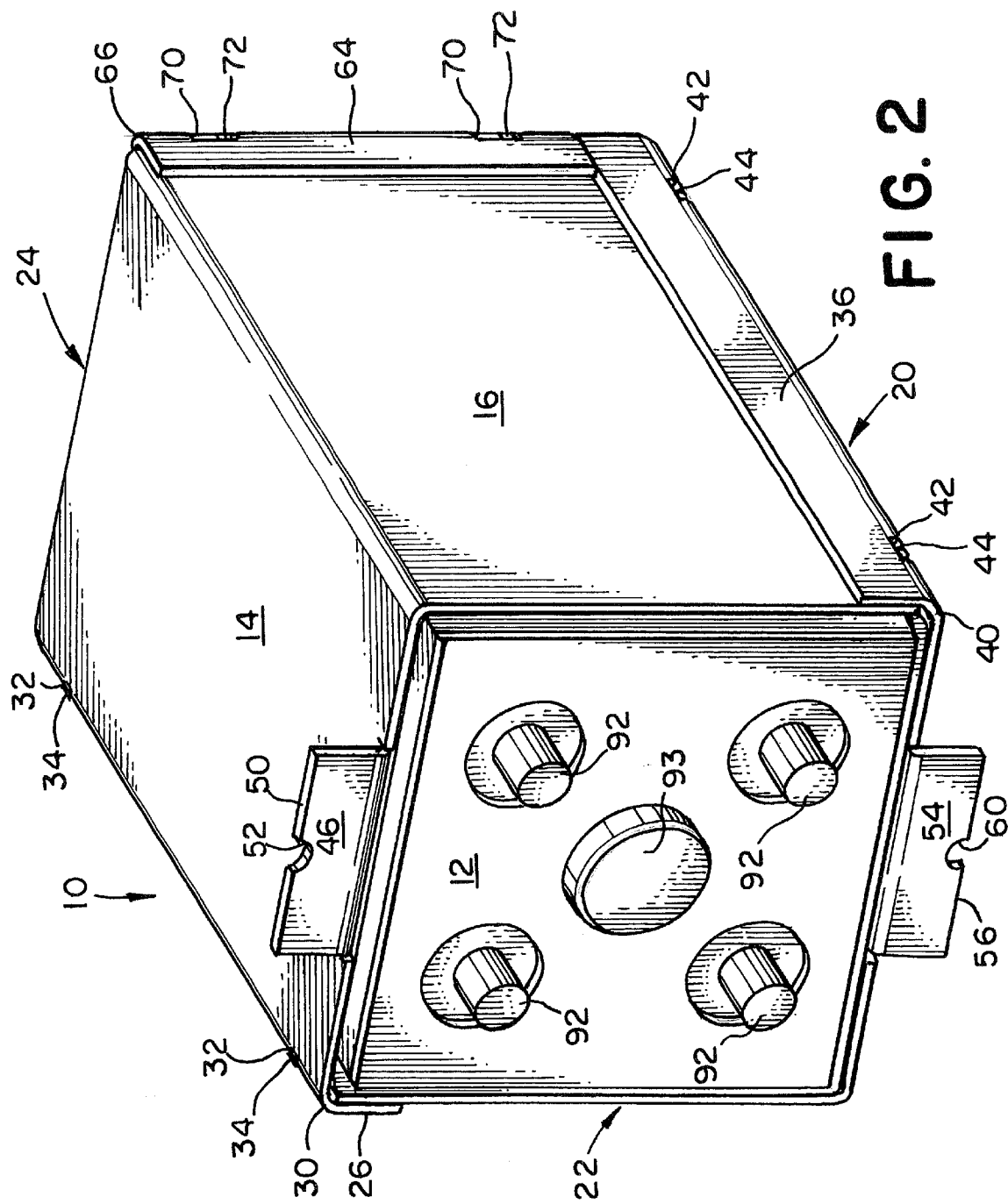
FIG. 2 is a perspective view of the battery sleeve shown in FIG. 1 with a battery inserted into the sleeve.
Figure 3:
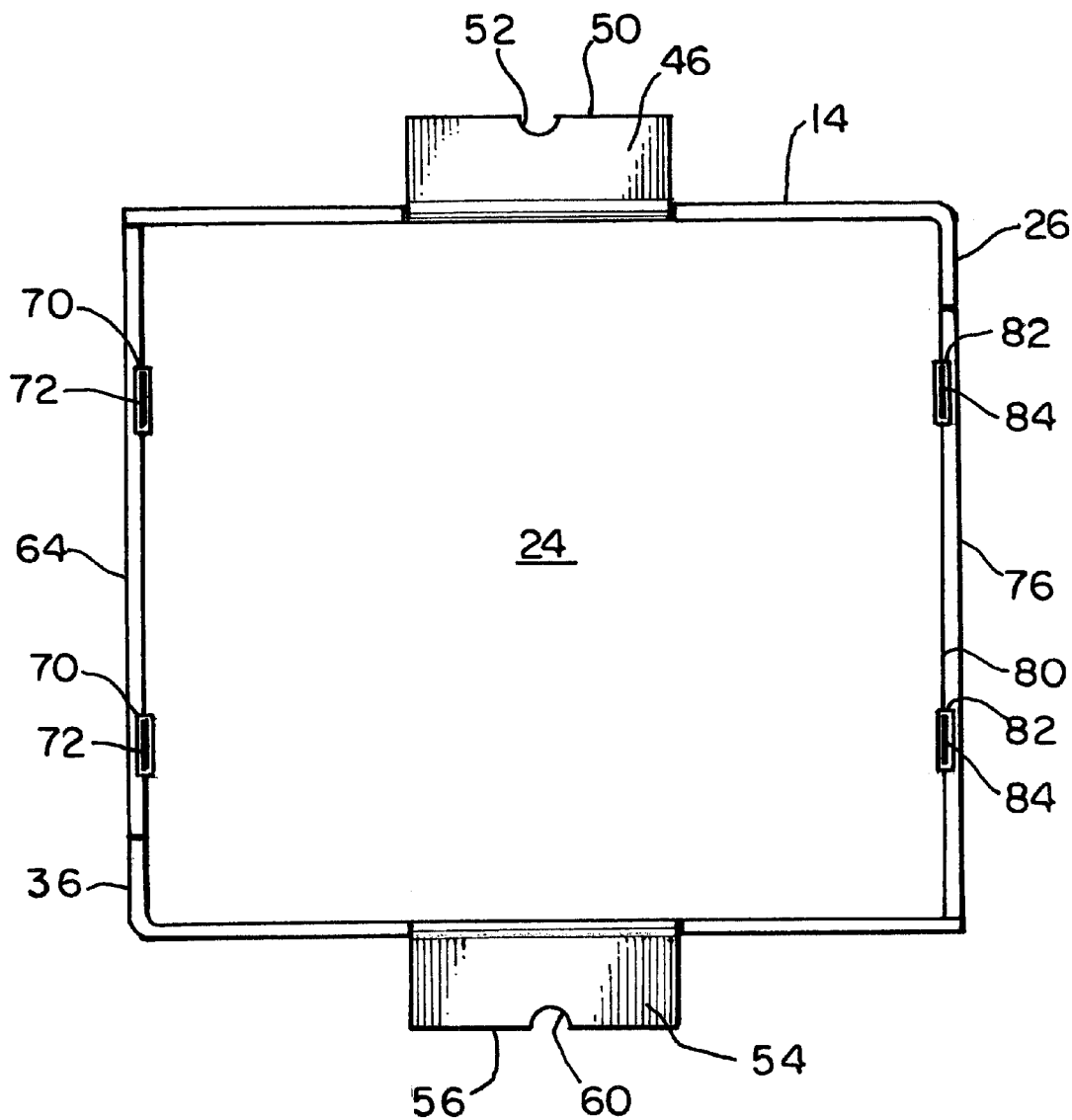
FIG. 3 is a rear elevational view of the battery sleeve shown in FIG. 1.

Referring to the drawings, wherein like numerals indicated like elements throughout, there is shown in FIGS. 1–3 a sleeve 10 for containing and supporting a battery 12. The sleeve 10 is preferably a parallelepiped in shape and is sized to accept and generally surround the battery 12 as shown in FIG. 2. The battery 12 is generally of a size well known for use with uninterruptable power supplies and telecommunication systems. However, the specific size of the battery and, thus the size of the sleeve 10 can be changed for any given application, and the present invention is not limited to a particular battery or sleeve size. The sleeve 10 is preferably constructed from three components, a top panel 14 with a first (right) side panel 16, a bottom panel 20 with a second (left) side panel 22, and a rear panel 24.

The left side of the top panel 14 includes a top lip 26 which extends downwardly along the length of the top panel 14, from the front to the rear. The top lip 26 is sized to extend over and engage at least a portion of the left side panel 22. An edge 30 formed by the intersection of the top panel 14 and the top lip 26 includes at least two elongated slots 32, each slot 32 being sized and shaped to accept a tang 34 extending from an upper edge of the left side panel 22. Each tang 34 locks into its respective slot 32, which positions the top panel 14 and the left side panel 22 for connection, preferably by welding or in some other known manner.

Similarly, the right side of the bottom panel 20 includes a bottom lip 36 which extends upwardly along the length of the bottom panel 20, from the front to the rear. The bottom lip 36 is sized to extend over and engage at least a portion of the right side panel 16. An edge 40 formed by the intersection of the bottom panel 20 and the bottom lip 36 includes at least two elongated slots 42, each slot 42 being sized and shaped to accept a tang 44 extending from a lower edge of the right side panel 16. Each tang 44 locks into its respective slot 42, which positions the bottom panel 20 and the right side panel 16 for connection, preferably by welding or in some other known manner.

The top panel 14 further includes a top connecting plate 46 which extends upwardly from the front of the top panel 14. The top connecting plate 46 is preferably centered between the left and right side panels 22, 16. A top edge 50 of the top connecting plate 46 includes a preferably semicircular shaped top cutout 52. Similarly, the bottom panel 20 further includes a bottom connecting plate 54 which extends downwardly from the front of the bottom panel 20. The bottom connecting plate 54 is preferably centered between the right and left side panels 16, 22. A bottom edge 56 of the bottom connecting plate 54 includes a preferably semicircular shaped bottom cutout 60. Preferably, the cutouts 52, 60 are located along a vertical axis 62 extending midway between the right and left side panels 16, 22.

As best seen in FIGS. 1 and 3, the rear panel 24 includes a right lip 64 which extends along the length of the right side of the rear panel 24, from the top of the rear panel 24 to the top of the bottom lip 36. The right lip 64 is sized to extend over and engage at least a portion of the right side panel 16. An edge 66 formed by the intersection of the rear panel 24 and the right lip 64 includes at least two elongated slots 70, each slot 70 being sized and shaped to accept a tang 72 extending from a rear edge of the right side panel 16. Each tang 72 locks into its respective slot 70, which positions the rear panel 24 and the right side panel 16 for connection, preferably by welding or in some other known manner.

Similarly, the rear panel 24 also includes a left lip 76 (shown in FIG. 3) which extends along the length of the left side of the rear panel 24, from the bottom of the rear panel 24 to the bottom of the top lip 26. The left lip 76 is sized to extend over and engage at least a portion of the left side panel 22. An edge 80 formed by the intersection of the rear panel 24 and the left lip 76 includes at least two elongated slots 82, each slot 82 being sized and shaped to accept a tang 84 extending from a rear edge of the left side panel 22. Each tang 84 locks into its respective slot 82, which positions the rear panel 24 and the left side panel 22 for connection, preferably by welding or some other known manner.

Although two tangs 34, 44, 72, 84 are preferred, those skilled in the art will recognize that more or less than two tangs 34, 44, 72, 84 can be used, and that the panels 14, 16, 20, 22 and 24 can be connected to each other by other methods, including but not limited to, mechanical connections if desired. Additionally, the sleeve 10 can be formed from a greater or lesser number of components, and could be a single component if desired.

Referring again to FIGS. 1 and 2, a front face 90 of the sleeve 10 is open to allow insertion of the battery 12 into the sleeve 10. While it is preferred that only one battery 12 can be inserted into each sleeve 10, it is recognized that the sleeve 10 can be sized and shaped such that more than one battery 12 can be inserted into the sleeve 10. Preferably, after each battery 12 is installed in its respective sleeve 10, the battery 12 is not thereafter removed from the sleeve 10. Thus, each battery 12 is protected by the sleeve 10 from the time the battery 12 is inserted into the sleeve 10 until the end of the useful life of the battery 12 when the battery 12 and sleeve 10 are preferable discarded together as a single unit.

During use, each battery 12 heats up. The sleeve 10 is sized to tightly engage five sides (top, right side, bottom, left side, and rear) of a battery 12 received therein such that, as each battery 12 within a sleeve 10 heats up and expands, compression forces between the battery 12 and the surrounding sleeve 10 are generally uniformly developed.

As shown in FIG. 2, the front surface of each battery 12 includes four terminals 92 for electrically connecting each battery 12 to at least one adjacent battery 12 in a manner which will hereinafter be described. Although batteries with four terminals 92 are preferred, those skilled in the art will recognize that batteries with more or less than four terminals 92 can be used if desired. Each battery 12 also, preferably includes a vent 93 which is also located on the front surface of the battery 12, although those skilled in the art will recognize that batteries without vents can be used or that the vent 93 may be at some other location, if desired.

Referring now to FIGS. 4–9, there is shown a sleeve frame assembly 100 in accordance with a first preferred embodiment of the present invention. The sleeve frame assembly 100 is designed to accommodate varying numbers of batteries 12 in sleeves 10, such as batteries used in an uninterruptable power supply. In the embodiment shown in FIGS. 5 and 6, twenty-four batteries 12 are installed in the sleeve frame assembly 100 and are connected together using a number of electrical connectors 94, 96, 98, as shown, to produce a power supply having the desired voltage and current capacity. In the illustrated embodiment, the batteries 12 are stacked in six horizontal rows of four batteries 12 per row, although those skilled in the art will recognize that the batteries 12 can be stacked in other configurations as well and that a greater or lesser number of batteries 12 can be used for a particular application.

The sleeve frame assembly 100 includes two base supports 102 which are adapted to be mounted to a floor "F" or other underlying supporting structure via bolts 104 or other suitable types of fasteners. Each base support 102 includes a generally "U-shaped" horizontal member 106 which is preferably, but not necessarily, chamfered at the top outer ends 110 of each leg 112 of the "U". However, those skilled in the art will recognize that the base supports 102 can be made in other shapes, including but not limited to, angle, flat plate, T-bar, or box channel. The base 114 of each base support 102 includes a plurality of bolt holes 116, preferably at least two which are spaced apart, for bolting the base support 102 to the floor "F".

Each base support 102 also includes two pairs of vertical braces 120 which each extend between the vertical legs 112 of the U-shaped member 106. Each pair of braces 120 includes an interior vertical brace 120a and an exterior vertical brace 120b. The braces 120a, 120b in each vertical brace pair 120 are spaced apart from each other by a predetermined distance which generally corresponds to the depth dimension of a leg 122 of a vertical corner support 124 of the sleeve frame assembly 100, which will be discussed in detail below. Each pair of vertical braces 120 includes aligned bolt holes 126 for bolting the respective vertical corner support 124 to the respective vertical brace pair 120 with a bolt 121. Preferably, each vertical brace 120 is fixedly connected to its respective U-shaped member 106 by welding. However, those skilled in the art will recognize that the vertical braces 120 can be connected to the U-shaped member 106 by other means, such as mechanical fasteners, or the entire base support 102 can be formed or machined from a single stock piece or as a single unit.

The sleeve frame assembly 100 further includes generally four "U-shaped" vertical corner supports 124, a front pair and a rear pair. A bottom end 130 of each vertical corner support 124 is mounted in the base support 102 between a pair of vertical braces 120, such that a free end 132 of each leg 122 of the vertical corner support 124 engages an interior vertical brace 120a and a base 134 of the vertical corner support 124 engages an exterior vertical brace 120b. In this manner the open portion of the U-shaped vertical corner supports 124 on each end of the sleeve frame assembly 100 face each other. As referred to above, each vertical corner support 124 is connected to a respective vertical brace pair 120 by a bolt 121, although those skilled in the art will recognize that the vertical corner supports 124 can be connected to the vertical brace pairs 120 by other means including, but not limited to, welding. Preferably, each of the front and rear vertical corner supports 124 is spaced from the other of the front and rear vertical corner supports 124 by a space sufficient to fit a desired number of sleeves 10 with batteries 12, in the present embodiment four sleeves 10. However, those skilled in the art will recognize that the vertical corner supports 124 can be spaced other distances to fit other numbers of sleeves 10 between the vertical corner supports 124.

Figure 4:
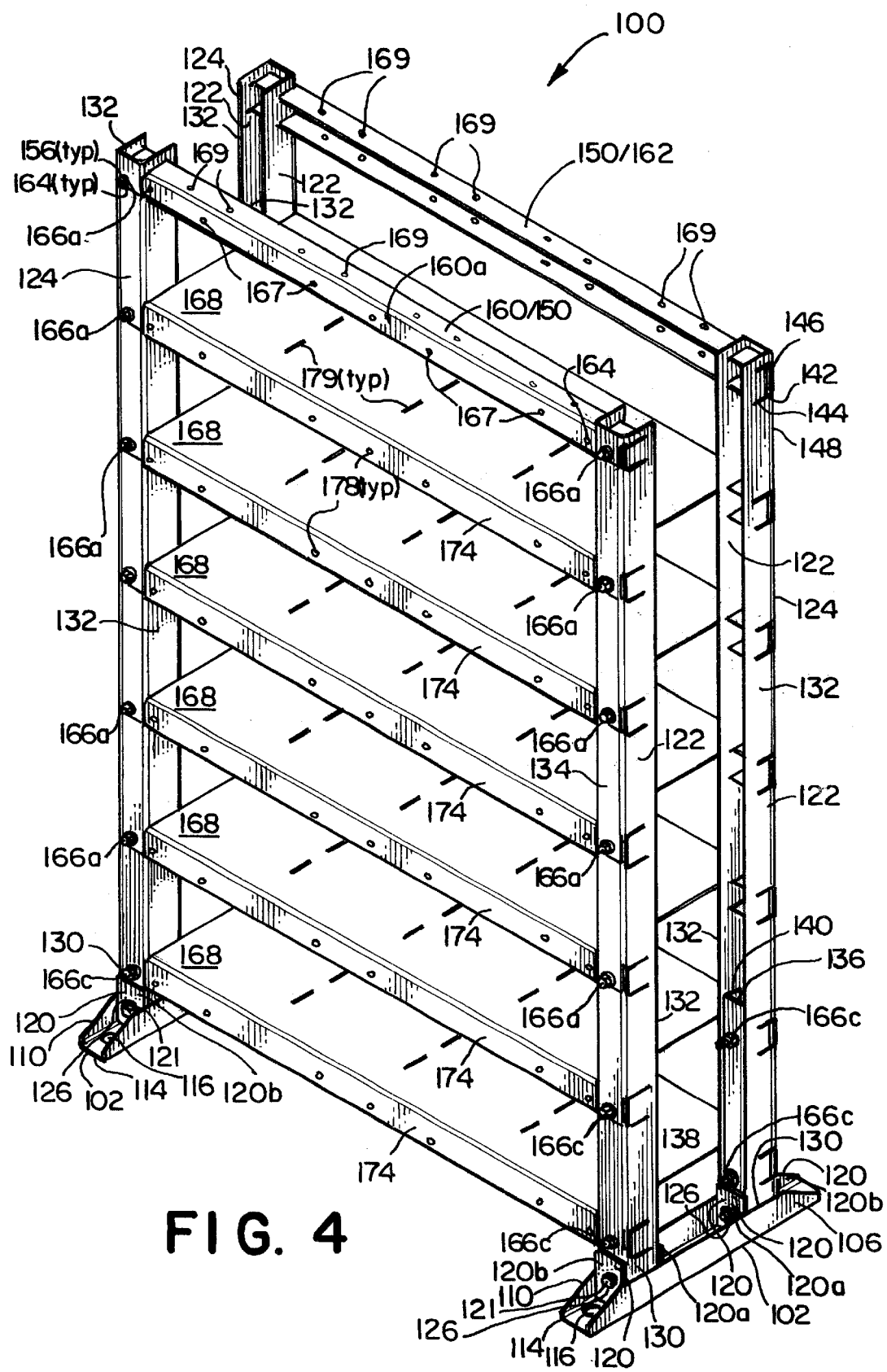
FIG. 4 is a perspective view of a battery sleeve frame assembly in accordance with a preferred embodiment of the present invention.
Figure 5:
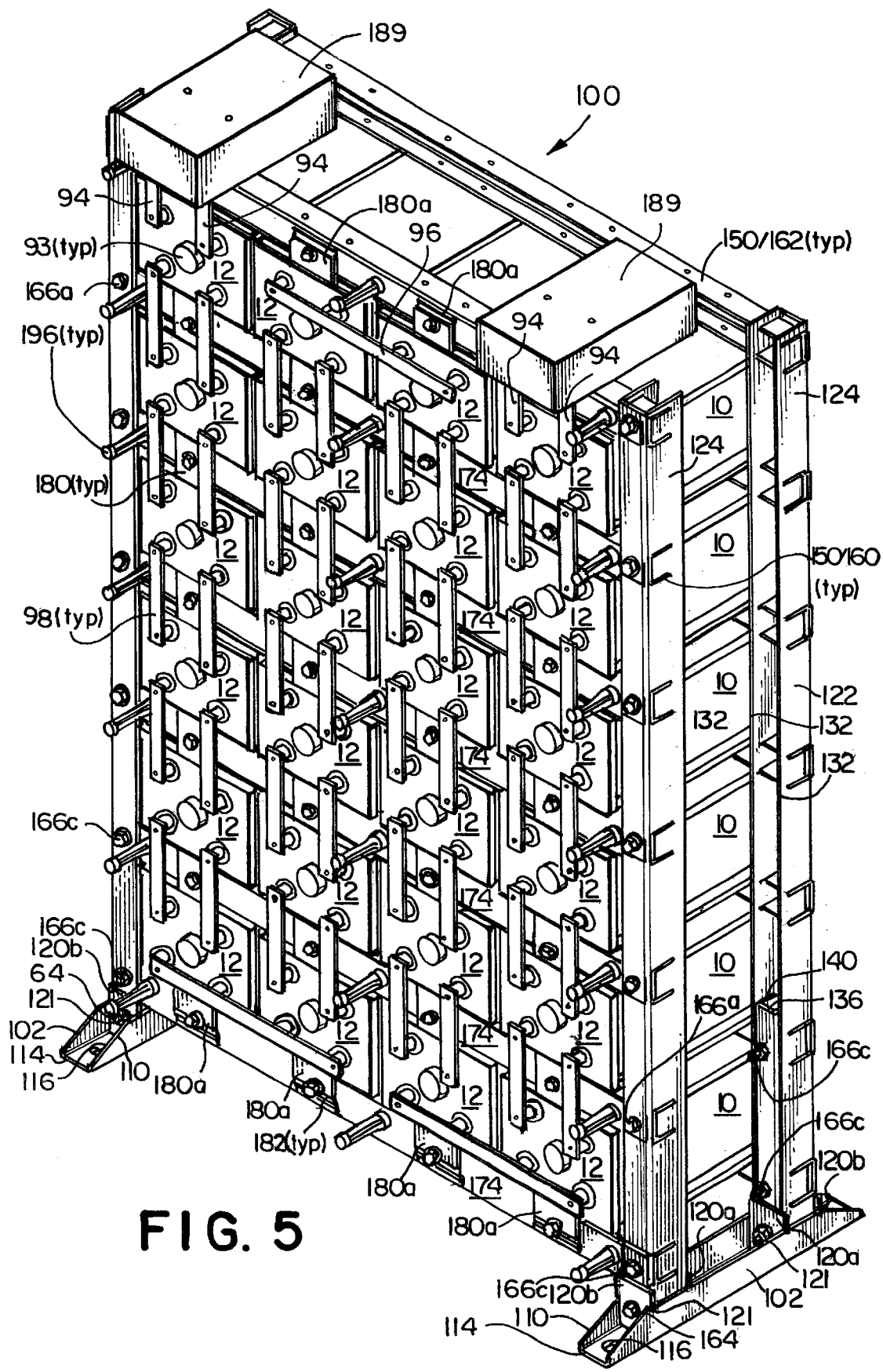
FIG. 5 is a perspective view of the battery sleeve frame assembly shown in FIG. 4 with batteries and battery sleeves inserted therein, the batteries being electrically connected to each other.

Referring to FIG. 5, a generally "U-shaped" stiffener 136 is preferably inserted into each vertical corner support 124 with a base 138 of the stiffener 136 engaging the interior vertical brace 120a and a free end of each leg 140 of the stiffener 136 engaging the base of the vertical corner support 124. Only the stiffener 136 which engages the right rear vertical corner support 124 is shown for clarity in FIGS. 4–7 (shown in dashed lines in FIG. 7). Each stiffener 136 extends part way up the length of the respective vertical corner support 124, preferably at least above a second horizontal support 150. Each stiffener 136 includes a pair of "U-shaped" slots 139 for reasons that will be described below.

Each vertical corner support 124 preferably includes seven pairs of generally "U-shaped" slots 142 extending through both legs 122 of the vertical corner support 124, with at least one leg 144 and preferably, both legs 44 of each slot 142 extending horizontally from the base of the vertical support 124 toward the free end of each leg 122. However, the legs 144 of the slots 142 do not extend the full length of the leg 122 of the vertical support 124, allowing the portion of the vertical support 124 inside the slot perimeter to remain connected to the remainder of the vertical support 124. The base 146 of each slot 142 extends between the legs 144 of the slot 142 along an edge 148 formed by the intersection of the leg 122 and the base of the vertical support 124. The slots 142 in each leg 122 are aligned with each other to allow a horizontal support 150 to be inserted therethrough, as will be described below. Each vertical support 124 also includes seven bolt holes 156 extending through the base of the vertical support 124, preferably spaced at predetermined locations midway between each vertical support leg 122. Those skilled in the art will recognize that the number of holes 156 and U-shaped slots 142 can be varied depending on the number and size of the batteries 12 and the height of the corner supports 124.

The sleeve frame assembly 100 preferably further includes seven pairs of horizontal "U-shaped" supports 150. Each horizontal support pair includes a front support 160 and a rear support 162. Each end of each of the front horizontal supports 160 is inserted into an aligned pair of U-shaped slots 142 in a respective front vertical corner support 124a and each end of each of the rear horizontal supports 162 is inserted into an aligned pair of U-shaped slots 142 in a respective rear vertical corner support 124b. Each end of each of the two lower pairs of horizontal supports 150 at the lower end of the vertical corner supports 124 are also inserted into a corresponding aligned pair of U-shaped slots 139 in the respective stiffeners 136.

A front panel 160a of each front horizontal support 160 preferably includes a plurality of bolt holes 164 spaced at predetermined distances. A bolt hole 164 at each end of each horizontal support 160 is aligned with a respective bolt hole 156 in each vertical corner support 124. The horizontal and vertical supports 150, 124 are connected to each other by a bolt 166a and nut (not shown) through the bolt holes 164, 156. Although the nut is preferably not connected to either the vertical corner support 124 or the horizontal support 150, those skilled in the art will recognize that the nut can be fixed (i.e. welded) to either the vertical corner support 124 or the horizontal support 150. The two lowermost pairs of horizontal supports 150 employ a longer bolt 166c than the remaining horizontal supports 150 so that the bolt 166c also extends through the stiffener 136 to provide additional strength to the lower end of the assembly 100.

Additional spaced apart bolt holes 167 are located on the front surface 160a of each of the front horizontal supports 160 for reasons that will be explained below. A weld nut 167a is preferably welded inside of the front surface 160a of each front horizontal support 160 over each bolt hole 167. Alternatively, a lock nut or other suitable fastener may be utilized, if desired. Additionally, the top surface of each of the topmost front 160 and rear horizontal supports 162 includes a plurality of spaced apart bolt holes 169 extending therethrough.

Figure 8:
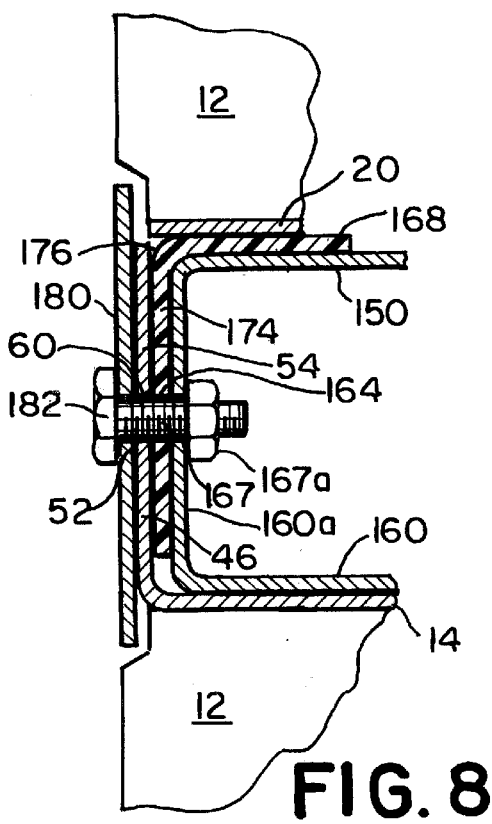
FIG. 8 is a sectional view taken along line 8—8 of FIG. 6.

With the exception of the top pair of horizontal supports 160, 162, a shelf 168 is preferably located over each front and rear horizontal support pair 160, 162 and extends generally the length of the horizontal supports 150 between the vertical corner supports 124. Preferably, as best shown in FIG. 8, each shelf 168 also includes a lip 174 which extends below a front longitudinal edge 176 of the shelf 168, and over the front surface of each respective front horizontal support 160. Each shelf 168 also includes a rear lip (not shown) which extends below a rear longitudinal edge of the shelf. The shelf lip 174 includes a plurality of bolt holes 178 extending therethrough. Each bolt hole 178 is aligned with a corresponding bolt hole 167 in the front horizontal support 160. Each shelf 168 is spaced from a next adjacent pair of horizontal supports 160, 162 a sufficient distance to permit a battery sleeve 10 to be inserted into the sleeve frame assembly 100 on the shelf 168 with minimal clearance between the top panel 14 of the sleeve 10 and the bottom of the next adjacent pair of horizontal supports 160, 162.

Preferably, each shelf 168 also includes a plurality of generally elongated vent holes 179 extending completely through the shelf 168, the vent holes 179 being spaced a predetermined distance from each other along the width of the shelf 168. The vent holes 179 are aligned with what would be spaces between adjacent battery sleeves 10 when the sleeves 10 are installed in the assembly 100. Although shelves 168 are preferred, those skilled in the art will recognize that shelves 168 are not required, and the battery sleeves 10 can be directly mounted on top of respective horizontal support pairs 160, 162 as long as the spacing between the front and rear horizontal supports 160, 162 is sufficiently small to enable each sleeve 10 to be supported by the front and rear horizontal supports 160, 162. Additionally, those skilled in the art will recognize that the horizontal supports 160, 162 can be pre-assembled with the shelves 168 in order to reduce assembly time. The sleeve frame assembly 100 as shown in FIG. 4 is ready to accept the battery sleeves 10, as shown in FIG. 5.

Figure 6:
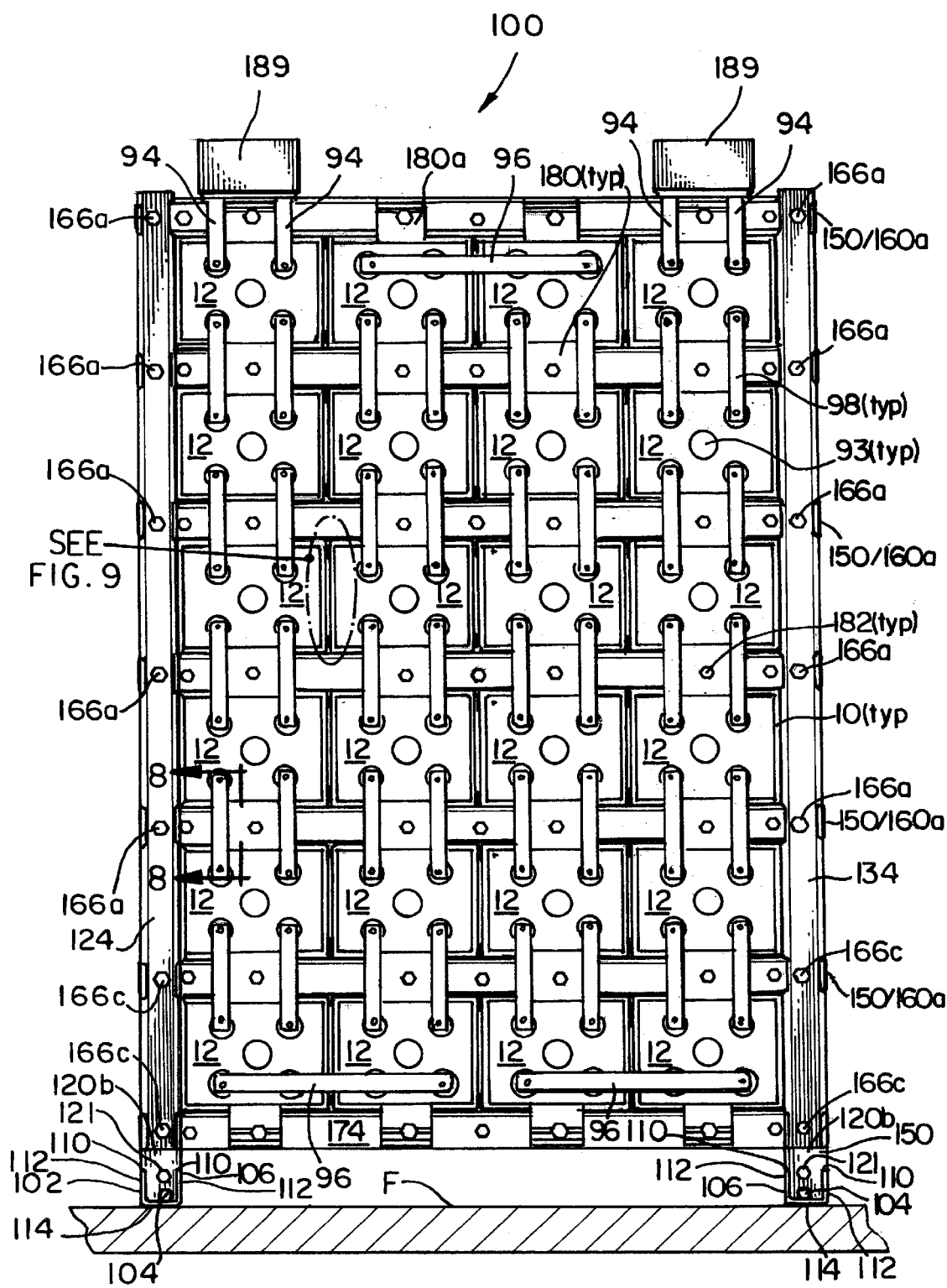
FIG. 6 is a front elevational view of the battery sleeve frame assembly shown in FIG. 5.
Figure 8A:
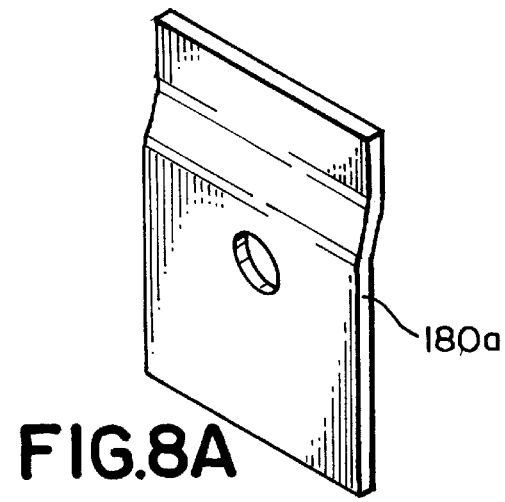
FIG. 8a is an enlarged perspective view of a preferred embodiment of a battery retainer for use with batteries on top or bottom shelves of the battery sleeve frame assembly of FIG. 6.

Referring now to FIGS. 5, 6 and 8, each sleeve 10 is insertable on a shelf 168 such that the rear surface of each top and bottom connecting plate 46, 54 is engaged with the front surface of the adjacent shelf lips 174. The semi-circular cutouts 52, 60 in each of the top and bottom connecting plates 46, 54 are aligned with one of the aligned respective bolt holes 178, 167 in the shelf lip 174 and front horizontal support 160. Preferably, a battery retainer 180 with a bolt 182 extending therethrough is bolted adjacent the top and bottom connecting plates 46, 54, with the bolt 182 extending through the semi-circular cutouts 52, 60, the shelf lip bolt hole 178 and the horizontal support bolt hole 167 and is secured by the weld nut 167a. The sleeves 10 on the top and bottom shelves 168 are retained by special retainers 180a, shown in FIG. 8a. The battery retainers 180, 180a connect each sleeve 10 to the sleeve frame assembly 100 to maintain each sleeve 10, and therefore each battery 12, in position on the sleeve frame assembly 100.

After installation and during use, each battery 12 in its respective sleeve 10 is held firmly in position on the shelf 168 from below via the shelf 168 and bottom connecting plate 54, and from above by the next upwardly adjacent front and rear horizontal supports 160, and the top connecting plate 46. Lateral and longitudinal movement of the sleeves 10 is prevented by the top and bottom connecting plates 46, 54, as well.

Figure 7:
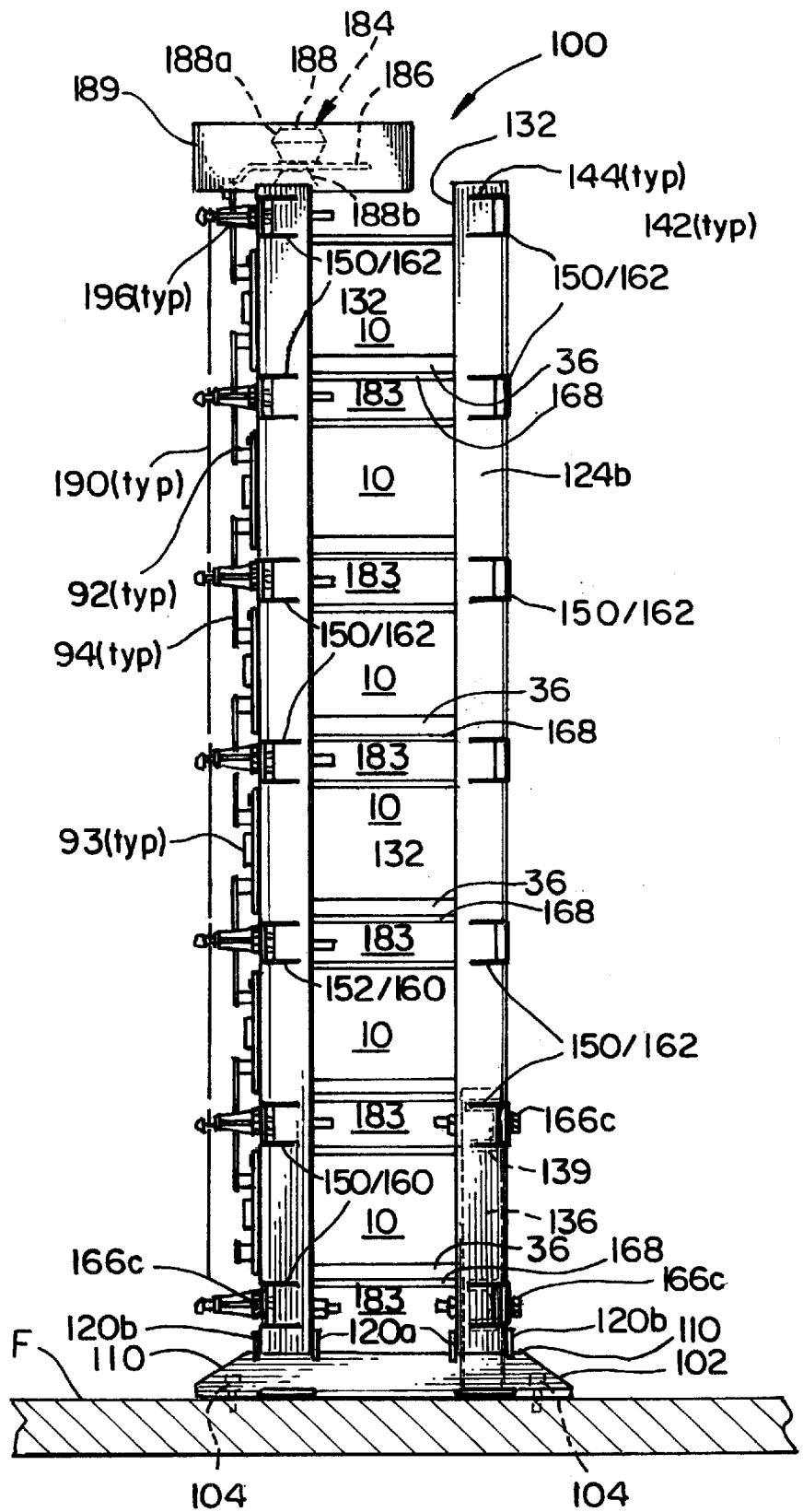
FIG. 7 is a right side elevational view of the battery sleeve frame assembly shown in FIG. 5, with a safety shield installed.
Figure 9:
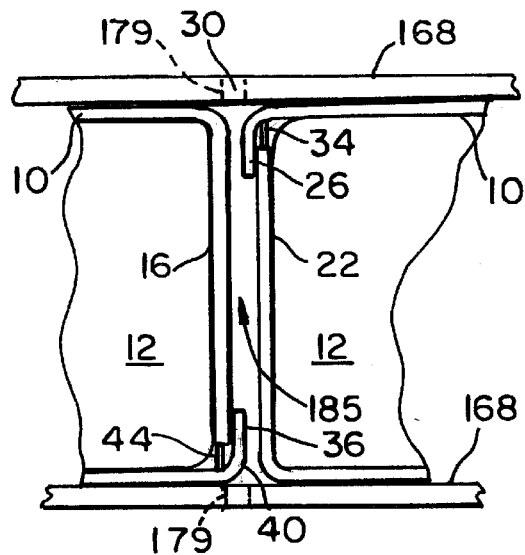
FIG. 9 is an enlarged view of the spacing between battery sleeves as shown in FIG. 6.

As seen in FIG. 7, an air space 183 exists between the top panel 14 of each sleeve 10 and the next upwardly adjacent shelf 168. This air space 183 exposes the top panel 14 of each sleeve 10 directly to circulating air, providing for thermal management. Also, as shown in FIG. 9, adjacent sleeves 10 on each shelf 168 are slightly separated from each other by a gap which is preferably at least approximately 1/8". Additionally, the top lip 26 of each sleeve 10 and the bottom lip 36 of each adjacent sleeve 10 provide for a vertical air space 185 between the lips 26, 36 when the adjacent sleeves 10 are installed next to each other on a shelf 168. The vertical air space 185 is aligned with the vent holes 179 extending through each of the shelves 168, thus exposing both sides of the sleeves 10 to circulating air and, providing for additional thermal management.

As shown in detail in FIGS. 5 and 6, a plurality of electrical connectors 94, 96, 98 are provided for making intra- and inter-cell connection between the terminals 92 of the batteries 12. Preferably, the connectors 94, 96, 98 are attached to the terminals using mechanical fasteners such as threaded fasteners (not shown) in order to create a positive electrical connection which does not loosen over time. While the intra- and inter-cell electrical connectors 94, 96, 98 are shown in a preferred configuration for a particular uninterruptable power supply assembly in FIGS. 5 and 6, it will be recognized by those skilled in the art from the present disclosure that different types of serial and parallel connections can be made between the terminals 92 to achieve different power and voltage ratings.

Referring to FIG. 7, a termination kit 184 (in phantom) is provided which can be mounted on top of or on the side of the sleeve frame assembly 100 depending upon where the power connection to the battery assembly is desired. The termination kit 184 includes a terminal plate 186 which is preferably connected to one of the electrical connectors 94, 96, 98. More than one terminal plate 186 can be used per termination kit 184. Preferably, the terminal plates 186 are mounted on insulators 188. A bottom insulator 188b is preferably connected to the top of the assembly 100 via a bolt (not shown) through bolt hole 169, and a stud (not shown) is used between the bottom and top insulators 188b, 188a to hold the terminal plate 186 in position. A shield 189 can be placed over the termination kit 184. Electrical connections to and from the batteries 12 are then made to the terminal plates 186 by the electrical connectors 94, 96, 98. It will be recognized by those skilled in the art from the present disclosure that the terminal kit 184 need not be used and that other types of connections can be made directly to the battery terminals 92 of the batteries 12 or to the intra- or inter-cell connectors 94, 96, 98, if desired.

Figure 10:
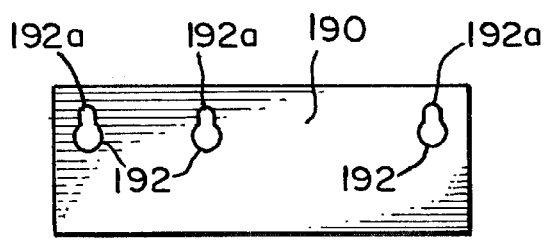
FIG. 10 is a front elevational view of a safety shield for installation on the front of the battery sleeve frame assembly of the present invention.
Figure 11:
FIG. 11 is an enlarged side elevation view of a preferred embodiment of a standoff used to support the safety shield of FIG. 10.

As shown in FIG. 7, a safety shield 190 can be installed over the front face of the sleeve assembly 100. The safety shield 190 is preferably made of a thin sheet of a transparent polymeric material and is preferably sized to fit over a single horizontal row of batteries 12, or over part of a single row of batteries 12. The safety shield 190, shown in FIG. 10, includes a plurality of predetermined spaced support holes 192. The support holes 192 are sized to allow a head 194 of a standoff 196, shown in FIG. 11, to be inserted therethrough. Each support hole 192 includes an elongated portion 192a at the top of the support hole 192. A neck 198 of the standoff 196 is sized to seat in the elongated portion 192a. Each standoff 196 is inserted into a respective bolt hole 164 (shown in FIG. 6) and the safety shield 190 is installed on the standoffs 196. The size of the support holes 192 allows an individual shield 190 to be lifted so that the standoff head 194 is generally centered in the support hole 192, and the safety shield 190 is pulled away from the assembly 100, providing access to the battery or batteries 12 located behind the safety shield 190. Since each safety shield 190 covers only a single row of batteries 12, a row of batteries can be accessed while the remaining batteries 12 remain shielded. However, a single larger shield could be utilized, if desired. As shown in FIG. 7, since the shield 190 extends in front of the batteries 12, side termination and lateral connections to adjacent assemblies 100 (not shown) is possible. Preferably, the standoffs 196 are constructed from a rigid polymeric material, although those skilled in the art will recognize that the standoffs 196 can be constructed from other materials as well.

The components of the sleeve frame assembly 100 are preferably bolted together for ease of manufacture and to allow flexibility in manufacturing different sized assemblies and to accommodate a wide array of installation spaces. However, those skilled in the art will recognize that the components of the sleeve frame assembly 100 can be connected to each other by other means, such as welding, riveting, or other suitable method.

Figure 12:
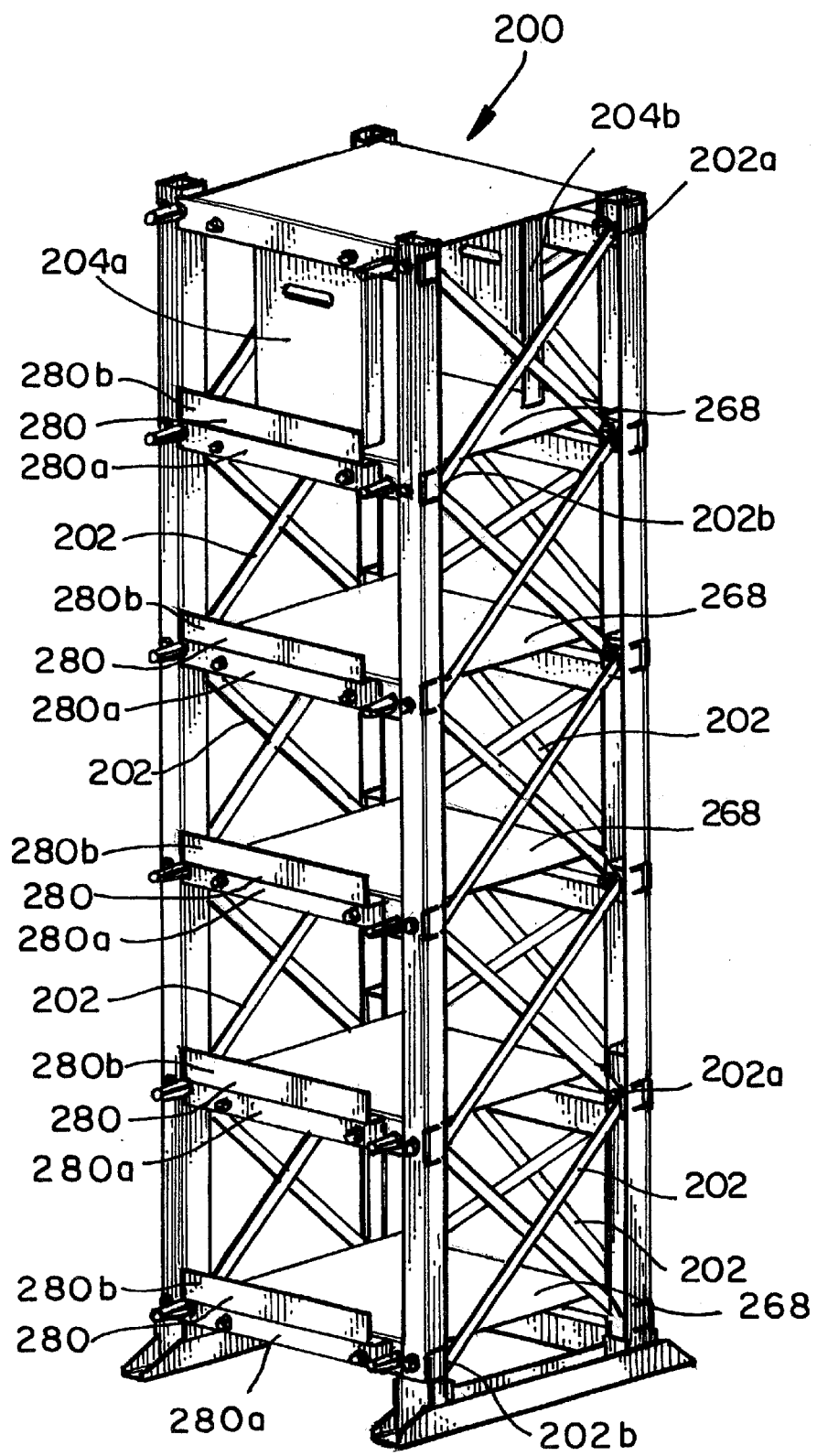
FIG. 12 is a perspective view of an alternate embodiment of the battery sleeve frame assembly of the present invention.
Figure 13:
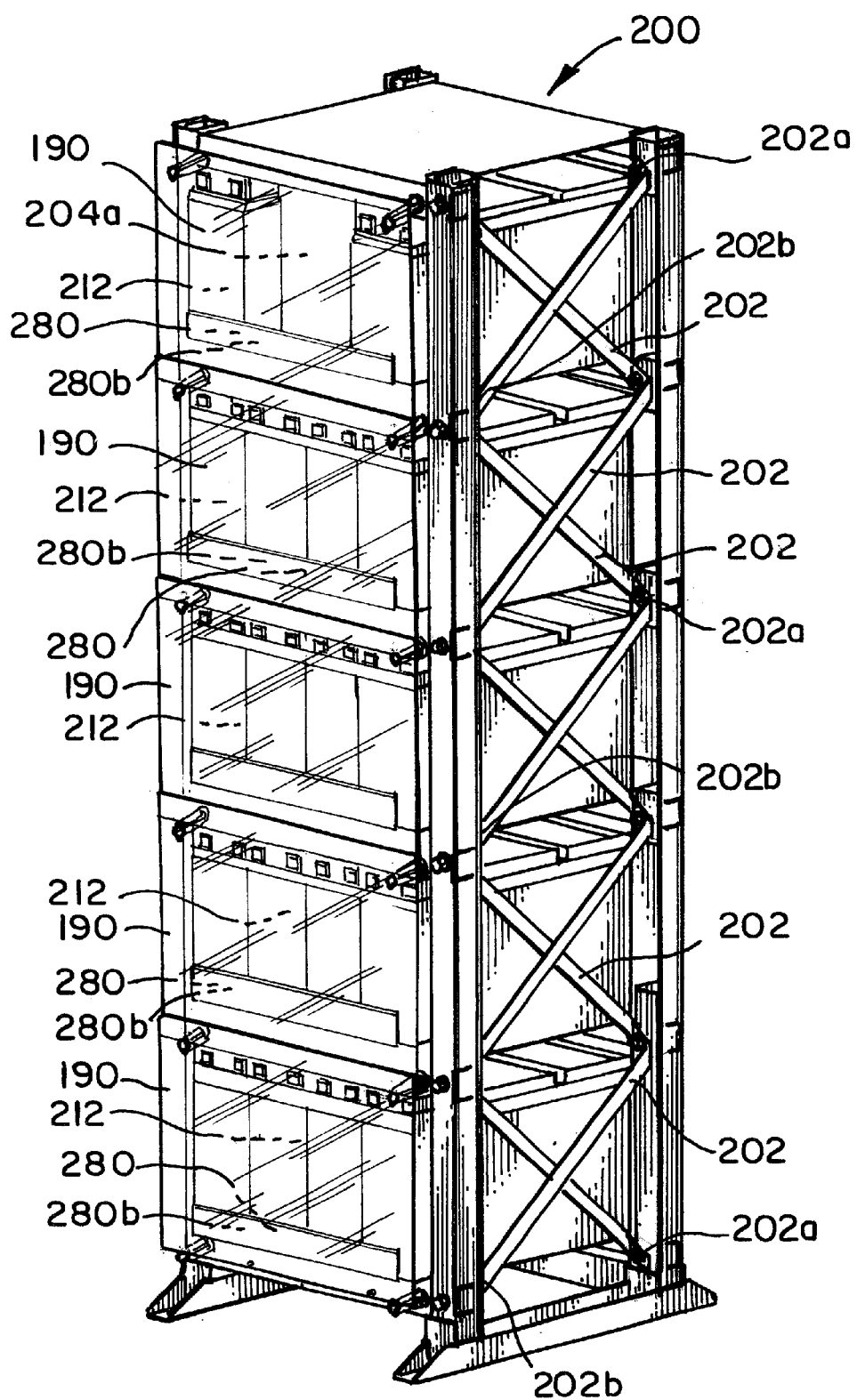
FIG. 13 is a perspective view of the battery sleeve frame assembly shown in FIG. 12, with batteries inserted in the assembly.

FIGS. 12 and 13 show a sleeve frame assembly 200 in accordance with an alternate embodiment of the present invention. The sleeve frame assembly 200 is similar to the sleeve frame assembly 100 with the following differences. The sleeve frame assembly 200 includes a plurality of cross braces 202 along the sides and rear of the assembly 200. A first end 202a of each cross brace 202 is connected to a vertical corner support 124, and a second end 202b of each cross brace is connected to an adjacent vertical corner support 124, at a shelf 268 either higher or lower than the first end 202a of the cross brace 202. The cross braces 202 provide additional strength to the sleeve frame assembly 200 compared to the sleeve frame assembly 100.

An additional difference between the sleeve frame assembly 200 and the sleeve frame assembly 100 is in the shelves 268. Unlike the shelves 168 of the first embodiment, the shelves 268 do not include vent holes 179. Still another difference between the sleeve frame assembly 200 and the sleeve frame assembly 100 is in the battery retainer 280. The battery retainer 280 is generally "S-shaped", with a lower leg 280a of the "S" bolted to the front of its respective shelf 268, and an upper leg 280b of the "S" extending outward of the assembly 200 and retaining a row of batteries 212 as shown in FIG. 13.

Additionally, the assembly 200 includes front and rear partition members 204a, 204b as shown on the top shelf 268 in FIGS. 12–13. The front and rear partition members 204a, 204b provide spacing between batteries 212 if the number of batteries 212 is insufficient to fill the entire shelf 268.

The sleeve 10 and the sleeve frame assemblies 100, 200 are all preferably constructed of steel, although those skilled in the art will recognize that any or all of the sleeve 10 and the sleeve frame assemblies 100, 200 can be constructed from other metallic or nonmetallic materials as well.

In accordance with the present design, the sleeve frame assemblies 100, 200 meets the 1997 Uniform Building Code requirements for seismic zone 4 applications when located at the seismic source from ground level to an elevation of 35% of building height. For zone 2 or less, the assemblies 100, 200 can be located at 100% of building height. A plurality of assemblies (not shown) can be positioned side-by-side with a slight gap between adjacent assemblies.

The sleeve frame assemblies 100, 200 allow convenient connection to a variety of optional accessories such as system electrical terminations (not shown) and also allows auxiliary equipment, such as power supplies and switching equipment (not shown) to be attached directly to the batteries 12.

It will be appreciated by those skilled in the art that changes can be made to the embodiment described above without departing from the broad inventive concept thereof. It is understood, therefore, that the invention is not limited to the particular embodiment disclosed that is intended to cover modifications within the scope and spirit of the present invention as set forth in the appended claims.

We claim:

1. A sleeve for receiving a battery, the sleeve comprising:
    a top panel with a connected side panel extending from a first side and a first lip extending from a second side thereof;
    a bottom panel with a connected side panel extending from a second side and a second lip extending from a first side thereof; and
    a rear panel with a third lip extending from a first side and a fourth lip extending from a second side thereof, the top panel lip extending over and engaging at least a portion of the second side panel, the bottom panel lip extending over and engaging at least a portion of the first side panel, the third lip of the rear panel extending over and engaging at least a portion of the first side panel and the fourth lip of the rear panel extending over and engaging at least a portion of the second side panel.

2. The battery sleeve as recited in claim 1 wherein the top panel and the first lip form an edge which includes at least two elongated slots extending therethrough, and wherein the second side panel includes at least two tangs extending outwardly therefrom, the tangs of the second side panel being received within the slots of the edge to position the top panel with respect to the second side panel.

3. The sleeve as recited in claim 2 wherein the tangs are secured in place within the slots.

4. The sleeve as recited in claim 3 wherein the tangs are welded within the slots.

5. The sleeve as recited in claim 1 wherein the top panel, bottom panel, rear panel and first and second side panels are all formed of steel.

6. The sleeve as recited in claim 1 wherein the assembled sleeve is sized to tightly engage a battery received therein so that as the battery heats through use and expands, compression forces between the battery and the sleeve develop in a generally uniform manner.

7. The sleeve as recited in claim 1 wherein at least one of the top panel and the bottom panel includes a connecting plate extending generally, perpendicularly from a front end thereof.

8. The sleeve as recited in claim 7 wherein the connecting plate is generally centered, side-to-side on the front end of the panel.

9. The sleeve as recited in claim 8 wherein the connecting panel includes a generally semicircular shape cutout area.

10. A frame assembly for receiving and supporting batteries in at least one horizontal row, the frame assembly comprising:
    a pair of generally parallel spaced apart, aligned base supports, each base support having a front end and a rear end;
    four vertical corner supports including a front pair and a rear pair, a first end of each corner support being secured to one of the base supports with the front pair of corner supports being generally equally spaced from the rear pair of corner supports; and
    at least one pair of horizontal supports, the horizontal support pair including a front horizontal support and a rear horizontal support, each horizontal support having two ends, each end of the front horizontal support being secured to one of the corner supports of the front pair of corner supports and each end of the rear horizontal support being secured to one of the corner supports of the rear pair of corner supports, the horizontal supports both being secured at each end to the corner supports at a first predetermined distance from the base supports the first predetermined distance being established so that at least one battery may be supported by the pair of horizontal supports to establish a horizontal battery row.

11. The frame assembly as recited in claim 10 wherein the base supports are each secured to an underline supporting structure.

12. The frame assembly as recited in claim 10 further including a second pair of horizontal supports includes a front horizontal support and a rear horizontal support, each horizontal support of the second pair having two ends, each end of the front horizontal support of the second pair of horizontal supports being secured to one of the corner supports of the front pair of cover supports and each end of the rear horizontal support of the second pair of horizontal supports being secured to one of the cover supports of the rear pair of corner supports, each of the horizontal supports of the second pair both being secured at each end to a corner support at a second predetermined distance from the base supports, the second predetermined distance being established so that at least one battery may be supported by the second pair of horizontal supports to establish a second horizontal battery row.

13. The frame assembly as recited in claim 12 wherein the vertical corner supports of each pair are separated by a third predetermined distance which is sufficient to provide space for at least two batteries in each horizontal row.

14. The frame assembly as recited in claim 13 wherein each vertical corner support includes at least two aligned slots for receiving and retaining therein the ends of the horizontal supports.

15. The frame assembly as recited in claim 13 further including a shelf extending over the horizontal supports of each horizontal support pair and extending between the vertical corner supports.

16. The frame assembly as recited in claim 15 wherein each shelf includes a lip which extends below a front longitudinal end thereof and over a front surface of the respective front horizontal support.

17. The frame assembly as recited in claim 15 wherein each shelf further includes a rear lip which extends below a rear longitudinal edge thereof and over a rear surface of the respective rear horizontal support.

18. The frame assembly as recited in claim 15 wherein each shelf includes a plurality of aligned, spaced vent holes extending therethrough.

19. The frame assembly as recited in claim 10 further including a retainer member for securing each battery to at least one horizontal support.

20. The frame assembly as recited in claim 10 further including at least one electrical connector for attachment to one or more terminals of at least one battery supported thereon.

21. The frame assembly as recited in claim 20 further including a plurality of electrical connectors for attachment to terminals of two or more batteries to establish serial or parallel electrical connections.

22. The frame assembly as recited in claim 10 further including a shield supported over the front surface of the frame assembly to cover one or more batteries supported thereon.

23. The frame assembly as recited in claim 22 wherein the shield is formed of a polymeric material.

24. The frame assembly as recited in claim 22 wherein the shield is supported by at least one insulating standoff secured to a horizontal support.

25. The frame assembly as recited in claim 22 wherein the shield is removable to provide access to the one or more batteries.

26. The frame assembly as recited in claim 22 wherein the shield covers all batteries within a single horizontal row.

\* \* \* \* \*